Jan. 27, 1942.     H. W. KOST     2,271,266

KNOB ATTACHING FASTENER

Filed July 23, 1940

Inventor
Harold W. Kost

By Malcolm W. Fraser

Attorney

Patented Jan. 27, 1942

2,271,266

UNITED STATES PATENT OFFICE 2,271,266

KNOB ATTACHING FASTENER

Harold W. Kost, Birmingham, Mich., assignor to Detroit Harvester Company, Detroit, Mich., a corporation of Michigan Application July 23, 1940, Serial No. 346,984

1 Claim. (Cl. 287—53)

This invention relates to fastening devices, but more particularly to a fastener for attaching a knob or similar part to a stud or other shaft-like member, and an object is to produce a simple and inexpensive sheet metal fastening device of this character which can be inexpensively manufactured on a production basis and conveniently applied to the end of a stud or shaft-like member and serves efficiently to secure the parts in assembled relation.

Other objects of the invention reside in details of construction, arrangement and assembly as will hereinafter appear, and, for purposes of illustration but not of limitation, an embodiment of the invention is shown on the accompanying drawing, in which—

Figure 1:
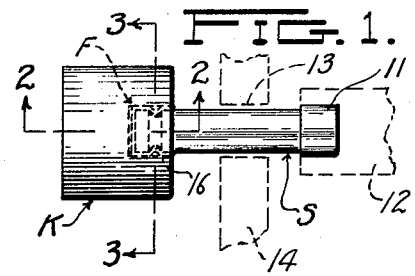
Figure 1 is a side elevation showing a stud and knob in assembled relation, the sheet metal fastening device retaining these parts in assembled relation.
Figure 2:
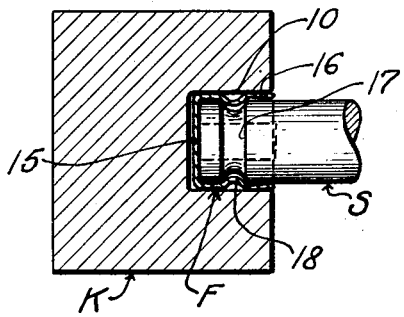
Figure 2 is an enlarged sectional view on the line 2—2 of Figure 1.
Figure 3:
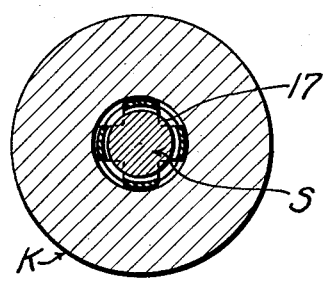
Figure 3 is an enlarged transverse sectional view on the line 3—3 of Figure 1.
Figure 4:
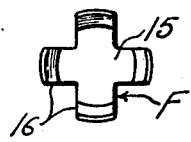
Figure 4 is an enlarged end view of the sheet metal fastener.
Figure 5:
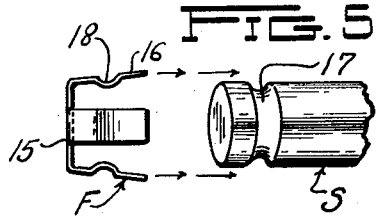
Figure 5 is a composite view in side elevation of the fastener and the end portion of the stud or shaft-like part to which the fastener is applied.

The illustrated embodiment of the invention comprises a knob K of plastic material, such, for example, as Bakelite or tenite. The knob K is formed at one end with a recess or socket 10, the diameter of which is very slightly larger than the diameter of the stud S, or at least the end portion of the stud S, which projects into the recess 10 as shown on the drawing. In this instance, the opposite end of the stud S has an enlargement 11 which is fixedly secured in any suitable manner to a member 12. The stud S extends through an opening 13 in a face panel 14.

For securing the end portion of the stud S within the socket 10 of the knob K, a sheet metal fastener F is provided. The fastener F is preferably formed by stamping and is of relatively light gauge spring steel. In this instance, the fastener F comprises a head 15 in the shape of a cross and of a size snugly to fit the end of the stud S. Projecting at substantially right angles from the head 15 are four equidistantly spaced arms or tongues 16, there being one tongue integral with each arm of the cross forming the head 15. The head 15 and arms 16 together form a cup-like body which is adapted to slide over the end portion of the stud S as shown particularly on Figure 6.

Spaced a short distance inwardly from the outer end portions of the stud S is an annular groove 17 which, in this instance, is formed with curved side walls. Each of the arms 16 is formed intermediate its ends with an inwardly curved depression 18, which when the fastener F is applied to the end portion of the stud S extend into the annular groove 17. It will be apparent that the free end portion of each of the tongues 16 beyond the depressed portion 18 inclines outwardly away from the outer surface of the stud S.

Figure 6:
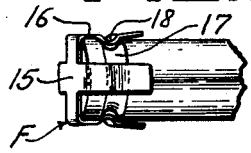
Figure 6 is a perspective view of an end portion of a stud with the sheet metal fastener mounted thereon in position of use.

In practice, it will be understood that the fastener is first forced over the end portion of the stud S, so that it is disposed in the position shown in Figure 6 with the inwardly extending or depressed portion 18 extending into the annular groove 17. Thereafter, the knob K is forced over the fastener. It is important that the distance between the free ends of the oppositely positioned arms or tongues 16 is slightly greater than the diameter of the recess or socket 10 of the knob K. Thus it will be manifest that when the knob is forced upon the stud S, the free end portions of the arms 16 will snugly and intimately be forced into frictional contact or biting engagement with the walls of the recess 10.

It will be apparent that the annular groove into which the depressed portions 18 extend enable a certain amount of flexing of the free ends of the arm 16 so that they may be forced against the outer surface of the stud S when the knob is forced into its final position upon the stud. It is manifest that the inwardly curved or depressed portions 18 militate against the fastener F coming loose from the stud S and in view of the intimate frictional engagement caused by the free end portions of the arm 16, the knob is satisfactorily held in place on the stud S. The parts may be pulled apart upon exerting considerable force but the frictional engagement between them retains them in assembled relation for normal use in many places, such as radio and refrigerator control knobs.

It is to be understood that numerous changes in details of construction, arrangement and choice of materials may be effected without departing from the spirit of the invention, especially as defined in the appended claim.

What I claim is:

The combination of a knob having a cylindrical socket therein, a stud extending into said socket, said stud being formed with an inwardly extending annular channel adjacent the end thereof, a cup-like fastener of relatively thin spring metal fitting over the end of said stud and including a plurality of spring arms interposed between the stud and the walls of said socket, each of said arms having a portion intermediate the ends thereof bowed inwardly, said inwardly bowed portions extending into and generally conforming to said annular channel, and the free ends of said arms beyond said inwardly bowed portions having a tendency to spring radially outwardly, thereby causing an intimate frictional contact between the free ends of said arms and the walls of said socket.

HAROLD W. KOST.